(12) United States Patent
Salter et al.

(10) Patent No.: US 10,328,896 B2
(45) Date of Patent: Jun. 25, 2019

(54) VEHICLE THEFT AVOIDANCE SYSTEMS AND ASSOCIATED METHODS

(71) Applicant: FORD GLOBAL TECHNOLOGIES, LLC, Dearborn, MI (US)

(72) Inventors: Stuart C. Salter, White Lake, MI (US); Pietro Buttolo, Dearborn Heights, MI (US); Annette Lynn Huebner, White Lake, MI (US); Paul Kenneth Dellock, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/598,713

(22) Filed: May 18, 2017

(65) Prior Publication Data

US 2018/0334137 A1 Nov. 22, 2018

(51) Int. Cl.
*B60R 25/20* (2013.01)
*B60R 25/102* (2013.01)
*B60R 25/33* (2013.01)
*B60R 25/10* (2013.01)

(52) U.S. Cl.
CPC ........ *B60R 25/2009* (2013.01); *B60R 25/102* (2013.01); *B60R 25/33* (2013.01); *B60R 25/1004* (2013.01); *B60R 2025/1013* (2013.01)

(58) Field of Classification Search
CPC .................................................. A61B 5/0024
USPC .................................. 15/870.07; 340/426.18
See application file for complete search history.

(56) References Cited

U.S. PATENT DOCUMENTS

| | | | |
|---|---|---|---|
| 5,307,048 A | 4/1994 | Sonders | |
| 5,319,350 A * | 6/1994 | DeMarco | B60R 25/1004 340/426.22 |
| 6,275,141 B1 * | 8/2001 | Walter | B60R 25/2009 180/287 |
| 6,924,735 B2 | 8/2005 | Ueda et al. | |
| 7,315,321 B2 * | 1/2008 | Polyakov | F41H 13/00 348/148 |
| 7,394,356 B2 * | 7/2008 | Kumabe | B60Q 1/50 340/436 |
| 8,451,105 B2 * | 5/2013 | McNay | B60R 25/25 340/426.11 |
| 9,067,489 B2 * | 6/2015 | Rovik | B60K 15/05 |
| 9,327,684 B2 * | 5/2016 | Kleinstuck | B60R 25/102 |
| 9,493,085 B2 | 11/2016 | Van Wiemeersch et al. | |
| 9,747,795 B1 * | 8/2017 | Espinosa | B60R 25/102 |
| 9,803,391 B2 * | 10/2017 | Banvait | B60R 25/01 |
| 9,807,547 B1 * | 10/2017 | Oesterling | H04W 4/008 |
| 2002/0128769 A1 * | 9/2002 | Der Ghazarian | G07B 15/04 701/408 |
| 2002/0147919 A1 * | 10/2002 | Gentry | A47G 29/141 726/2 |

(Continued)

FOREIGN PATENT DOCUMENTS

FR 2809132 A1 11/2001
WO 99/10209 3/1999

*Primary Examiner* — Santiago Garcia
(74) *Attorney, Agent, or Firm* — Carlson, Gaskey & Olds

(57) ABSTRACT

A vehicle theft avoidance system for improving vehicle security is disclosed. The system includes an awareness system configured to detect an unauthorized object near a vehicle, and a control system in communication with the awareness system and configured to automatically issue a warning if the awareness system detects the unauthorized object near the vehicle.

19 Claims, 6 Drawing Sheets

(56) References Cited

U.S. PATENT DOCUMENTS

| | | | | |
|---|---|---|---|---|
| 2002/0162601 A1* | 11/2002 | Jin | ........................ | B67D 7/065 |
| | | | | 141/94 |
| 2002/0195878 A1* | 12/2002 | Willats | .................... | E05B 77/48 |
| | | | | 307/10.2 |
| 2003/0009271 A1* | 1/2003 | Akiyama | .............. | G06F 21/335 |
| | | | | 701/29.6 |
| 2003/0016130 A1* | 1/2003 | Joao | .................... | B60R 25/102 |
| | | | | 340/539.1 |
| 2003/0076221 A1* | 4/2003 | Akiyama | .......... | H04L 12/40182 |
| | | | | 340/12.32 |
| 2006/0220412 A1* | 10/2006 | Norton | ...................... | B60J 5/06 |
| | | | | 296/97.2 |
| 2008/0167759 A1* | 7/2008 | Chiu | ....................... | B60R 25/24 |
| | | | | 701/2 |
| 2009/0096578 A1* | 4/2009 | Ogino | .................. | B60R 25/245 |
| | | | | 340/5.72 |
| 2011/0037620 A1* | 2/2011 | Paun | ....................... | B60R 25/10 |
| | | | | 340/932.2 |
| 2011/0282537 A1* | 11/2011 | Yamasaki | ............... | G06F 3/017 |
| | | | | 701/31.4 |
| 2012/0280805 A1* | 11/2012 | Magner | .............. | G07C 9/00174 |
| | | | | 340/426.11 |
| 2013/0279308 A1* | 10/2013 | Helm | .................... | H04H 60/27 |
| | | | | 369/7 |
| 2014/0152255 A1* | 6/2014 | Lovett | .................. | H02J 7/0029 |
| | | | | 320/109 |
| 2015/0283937 A1 | 10/2015 | Salter et al. | | |
| 2016/0138513 A1* | 5/2016 | Kim | ...................... | F02D 41/062 |
| | | | | 123/495 |
| 2016/0305166 A1* | 10/2016 | Georgi | .................. | E05B 81/72 |
| 2017/0064516 A1 | 3/2017 | Buttolo et al. | | |
| 2017/0070862 A1 | 3/2017 | Buttolo et al. | | |
| 2017/0101110 A1* | 4/2017 | Yoo | ....................... | B60W 10/18 |
| 2017/0246985 A1* | 8/2017 | Dellock | ............... | B60Q 1/2619 |
| 2017/0326982 A1* | 11/2017 | Williams | ............... | B60K 35/00 |

\* cited by examiner

VEHICLE THEFT AVOIDANCE SYSTEMS AND ASSOCIATED METHODS

TECHNICAL FIELD

This disclosure relates to vehicle theft avoidance systems for avoiding theft during fueling, loading, and other events in which the vehicle operator is absent from the vehicle and temporarily distracted.

BACKGROUND

In recent years, thieves called "sliders" have been known to cagily approach a victim's vehicle and snatch valuables from open windows or unlocked doors of the vehicle while the vehicle owner is distracted pumping gas, unloading groceries, fetching the mail, etc. The term "slider" is used because these criminals typically slide out of their own vehicle, staying low so that they cannot be seen by someone standing on the other side of the targeted vehicle, and then reach through the vehicle's door or window to snatch valuables from the vehicle. Existing vehicle security systems are not equipped to protect the valuables located inside the vehicle when the vehicle owner is temporarily distracted.

SUMMARY

A vehicle theft avoidance system according to an exemplary aspect of the present disclosure includes, among other things, an awareness system configured to detect an unauthorized object near a vehicle, and a control system in communication with the awareness system and configured to automatically issue a warning if the awareness system detects the unauthorized object near the vehicle.

In a further non-limiting embodiment of the foregoing vehicle theft avoidance system, the awareness system includes a plurality of sensors.

In a further non-limiting embodiment of either of the foregoing vehicle theft avoidance systems, the plurality of sensors include a combination of at least two of proximity sensors, ultrasonic sensors, radar sensors, and LIDAR sensors.

In a further non-limiting embodiment of any of the foregoing vehicle theft avoidance systems, a communication system is configured to issue the warning to a personal electronic device of an authorized user of the vehicle.

In a further non-limiting embodiment of any of the foregoing vehicle theft avoidance systems, the warning is a visual warning or an audible warning.

In a further non-limiting embodiment of any of the foregoing vehicle theft avoidance systems, the warning is a message sent to a personal electronic device of an authorized user of the vehicle.

In a further non-limiting embodiment of any of the foregoing vehicle theft avoidance systems, a fuel door sensor is configured to monitor whether a fuel door of the vehicle is open or closed.

In a further non-limiting embodiment of any of the foregoing vehicle theft avoidance systems, the control module is configured to automatically lock each door and close each window of the vehicle if the fuel door is open.

In a further non-limiting embodiment of any of the foregoing vehicle theft avoidance systems, a tracking system is configured to track a positioning of an authorized user of the vehicle.

In a further non-limiting embodiment of any of the foregoing vehicle theft avoidance systems, the tracking system includes a first wireless device that communicates with a second wireless device of the authorized user to track the positioning of the authorized user.

A method according to another exemplary aspect of the present disclosure includes, among other things, monitoring whether a fuel door of a vehicle is open or closed, and automatically locking each door of the vehicle and closing each window of the vehicle if the fuel door is open.

In a further non-limiting embodiment of the foregoing method, the fuel door is monitored with a fuel door sensor.

In a further non-limiting embodiment of either of the foregoing methods, the method includes monitoring whether an unauthorized object is approaching or attempting to enter the vehicle.

In a further non-limiting embodiment of any of the foregoing methods, the method includes issuing a warning to an authorized user of the vehicle if the unauthorized object is approaching or attempting to enter the vehicle.

In a further non-limiting embodiment of any of the foregoing methods, the warning includes communicating the warning to a personal electronic device of the authorized user.

A method according to another exemplary aspect of the present disclosure includes, among other things, tracking a location of an authorized user relative to a vehicle, entering a security engaged state if the authorized user is outside the vehicle, and warning the authorized user if an unauthorized object is approaching or attempting to enter the vehicle during the security engaged state.

In a further non-limiting embodiment of the foregoing method, warning the authorized user includes communicating the warning to a personal electronic device of the authorized user.

In a further non-limiting embodiment of either of the foregoing methods, entering the security engaged state includes locking each door of the vehicle and closing each window of the vehicle.

In a further non-limiting embodiment of any of the foregoing methods, tracking the location of the authorized user includes determining a proximity of a personal electronic device of the authorized user relative to the vehicle.

In a further non-limiting embodiment of any of the foregoing methods, determining the proximity of the personal electronic device includes communicating Bluetooth Low Energy signals between a first wireless device of a tracking system and a second wireless device of the personal electronic device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle theft avoidance systems and their associated methods for avoiding the theft of valuables located inside a vehicle. An exemplary vehicle theft avoidance system includes a sensor system configured to detect an unauthorized object (i.e., a thief, onlooker, etc.) near the vehicle, and a control system in communication with the sensor system and configured to automatically lock each door and close each window of the vehicle if the sensor system detects the unauthorized object near the vehicle. A warning can also be issued to alert the vehicle owner of the presence of the unauthorized object. Use of the exemplary theft avoidance systems of this disclosure may improve vehicle security during fueling events, grocery loading/unloading events, or other similar events in which the vehicle operator is temporarily external from the vehicle and distracted for one reason or another. These and other features of the disclosure are described in greater detail below.

Figure 1:
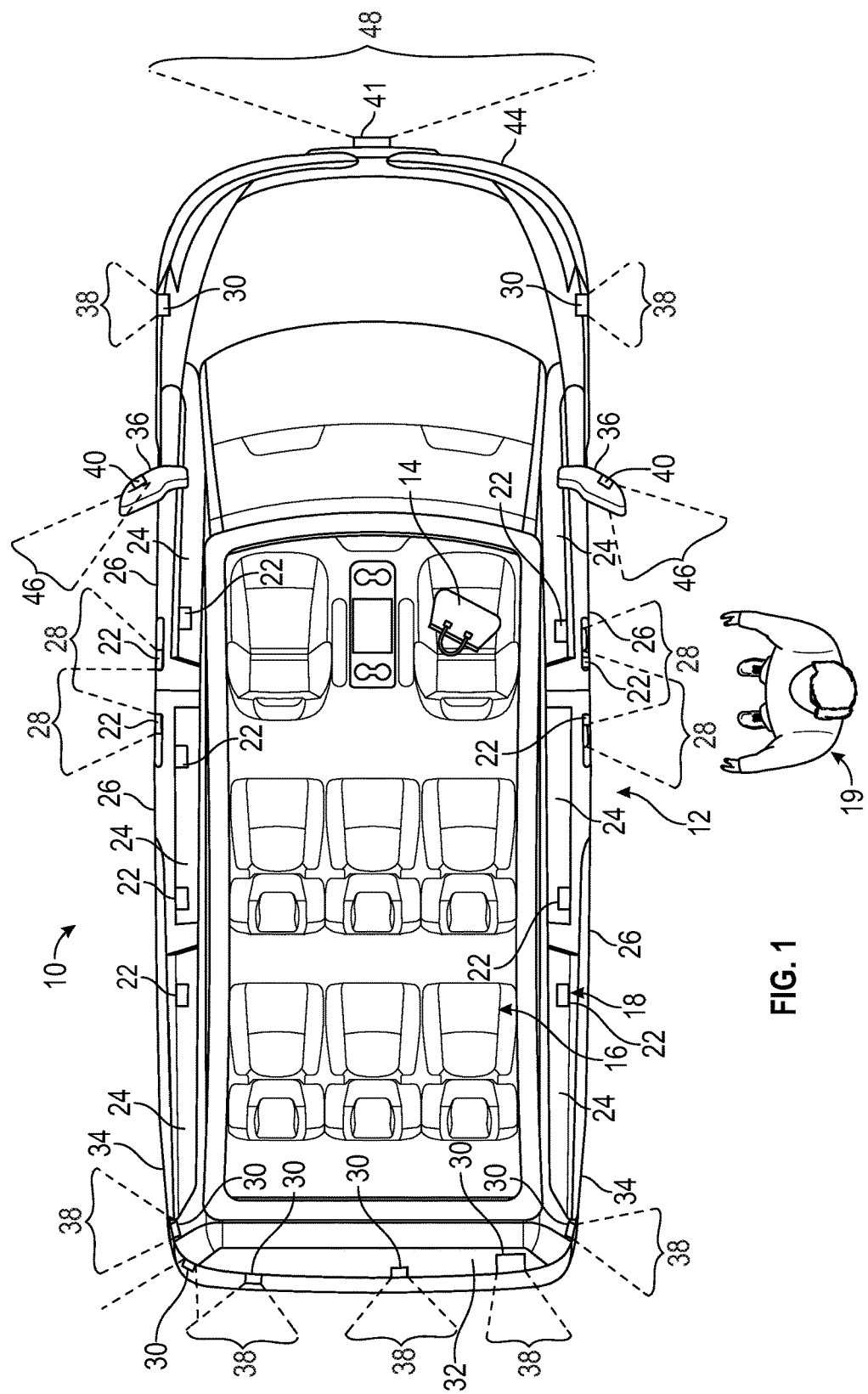
FIG. 1 illustrates a vehicle equipped with an awareness system.

FIG. 1 schematically illustrates a vehicle 10. The vehicle 10 may be a car, a truck, a van, a sport utility vehicle, or any other type of vehicle. The vehicle 10 could also be a conventional motor vehicle or a battery powered hybrid or electric vehicle.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may be equipped with a vehicle awareness system 12 for improving the security capabilities of the vehicle 10. In an embodiment, the vehicle awareness system 12 is one of several components of a theft avoidance system (see, e.g., FIGS. 2 and 4) that operates to protect one or more valuables 14 (e.g., a purse, an electronic device, etc.) located within a passenger cabin 16 of the vehicle 10 during a time at which an authorized user (e.g., driver, etc.) of the vehicle 10 is external to the passenger cabin 16 and is temporarily distracted. The authorized user of the vehicle 10 could be external from the vehicle 10 and distracted for various reasons. For example, the authorized user could be fueling or charging the vehicle 10 at a fueling/charging station, loading groceries or other cargo into the vehicle 10, fetching mail from a mailbox, etc. The reason for the authorized user's distraction is not intended to limit this disclosure.

The vehicle awareness system 12 may include a sensor system 18. The sensor system 18 includes a plurality of sensors that can detect whether an unauthorized object 19 (i.e., a thief, onlooker, etc.) is approaching or is near the vehicle 10. As further detailed below, the sensor system 18 could include various combinations of at least two of the following types of sensors: proximity sensors, ultrasonic sensors, radar sensors, LIDAR sensors, cameras, etc.

In an embodiment, the sensor system 18 includes one or more proximity sensors 22. The proximity sensors 22 may be coupled to or otherwise integrated into windows 24 and doors 26 of the vehicle 10, as non-limiting examples. In an embodiment, the proximity sensors 22 are capacitive sensors capable of detecting an object, such as the unauthorized object 19, located at a predefined distance from the vehicle 10. Each proximity sensory 22 may be sized to produce a sense activation field 28 that enables objects located proximate the vehicle 10 to be detected. For example, the sense activation field 28 may be altered or disturbed when an object's body part, which has electrical conductivity and dielectric properties, is within the range of the sense activation field 28.

In another embodiment, the sensor system 18 includes one or more ultrasonic sensors 30. The ultrasonic sensors 30 may be positioned at various locations of the vehicle 10, including but not limited to, a rear bumper 32, side panels 34, and side mirrors 36 of the vehicle 10. Other locations are also contemplated within the scope of this disclosure. In use, the ultrasonic sensors 30 emit acoustic pulses 38 at relatively high frequencies that are beyond human hearing capabilities. If an object is near, the acoustic pulses 38 reflect off of the object back toward the ultrasonic sensors 30. The distance of the object relative to the vehicle 10 may then be determined based on the time interval that occurs between emitting the acoustic pulses 38 and sensing an echo of the acoustic pulse after it has reflected off of the object.

The ultrasonic sensors 30 may have uses beyond those pertaining to the vehicle awareness system 12. For example, the ultrasonic sensors 30 could be part of a vehicle backup assist system, a vehicle parking assist system, and/or a vehicle blind spot monitoring system, among other potential vehicle systems.

In yet another embodiment, the sensor system 18 includes one or more radar sensors 40, LIDAR sensors 41, or both. In an embodiment, the radar sensors 40 are positioned at the side mirrors 36 of the vehicle 10, and the LIDAR sensor 41 is positioned at a front bumper 44 of the vehicle 10, or vice versa. Other locations and configurations are also contemplated within the scope of this disclosure. The radar sensors 40 operate by transmitting radio signals 46 and detecting reflections of those signals to determine whether an object is near the vehicle 10. The LIDAR sensors 41 operate by emitting light 48 and detecting reflections of the light to determine whether an object is near the vehicle 10.

The radar sensors 40 and LIDAR sensors 41 may also have uses beyond those pertaining to the vehicle awareness system 12. For example, these sensors could be part of a vehicle collision avoidance system or a vehicle blind spot monitoring system, among other potential vehicle systems.

Figure 2:
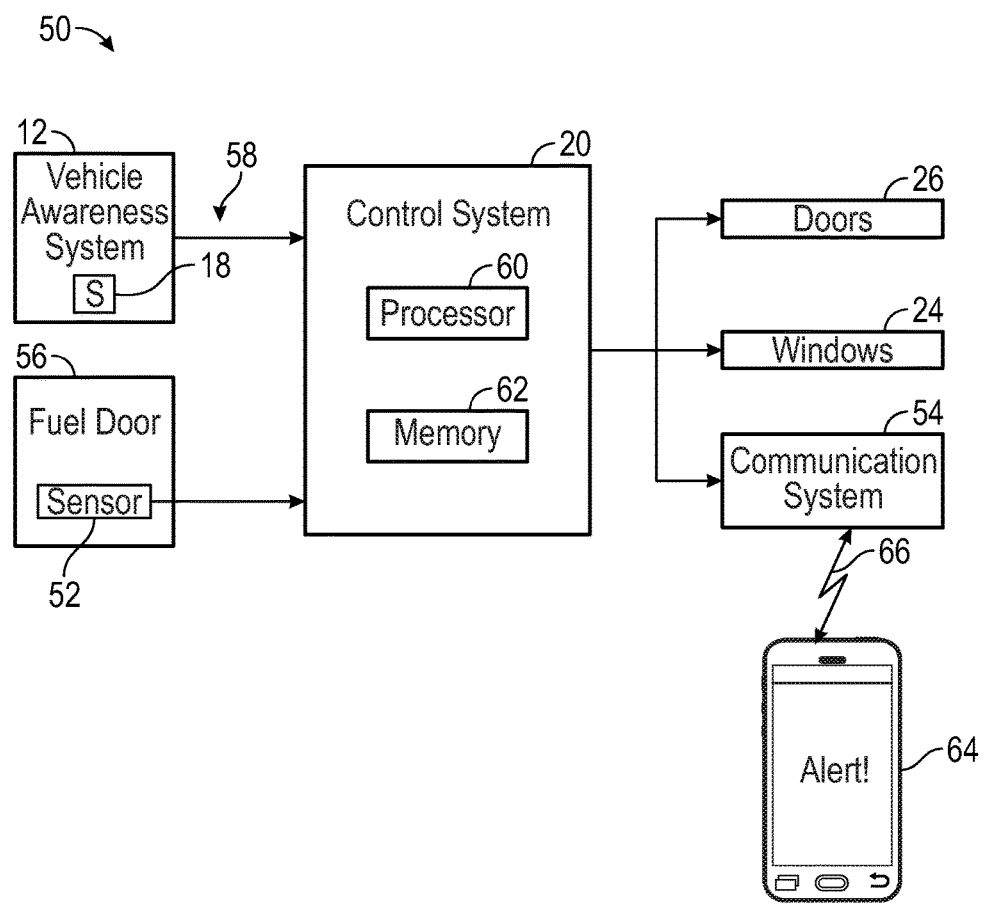
FIG. 2 illustrates a block diagram of a theft avoidance system according to a first embodiment of this disclosure.

FIG. 2, with continued reference to FIG. 1, schematically illustrates a theft avoidance system 50 that can be employed to improve the overall security of the vehicle 10. For example, the theft avoidance system 50 may reduce the likelihood that someone will tamper with the vehicle 10 at a time in which an authorized user is external to the passenger cabin 16 of the vehicle 10 and is temporarily distracted. In an embodiment, the theft avoidance system 50 includes the vehicle awareness system 12, a fuel door sensor 52, a control system 20, and a communication system 54. However, the theft avoidance system 50 could include additional components than those shown in the highly schematic rendering of FIG. 2.

The fuel door sensor 52 is a sensor equipped to monitor a positioning of a fuel door 56 of the vehicle 10. When closed, the fuel door 56 conceals a receptacle for receiving a dispenser device from a fuel fill station or a charging station. When the fuel door 56 is opened, the dispenser device may be inserted into or otherwise connected to the receptacle. The fuel door sensor 52 may send a signal to the control system 20 when the fuel door 56 is moved from the closed to the open position.

In an embodiment, the fuel door sensor 52 is a capacitive sensor. However, other sensor types are also contemplated within the scope of this disclosure.

As detailed above with respect to the description accompanying FIG. 1, the vehicle awareness system 12 includes the sensor system 18 and is configured for monitoring whether an unauthorized object 19 (i.e., a thief, onlooker, etc.) is near, approaching, or attempting to enter the vehicle 10. The vehicle awareness system 12 may send a signal to the control system 20 if an unauthorized object 19 is detected.

The vehicle awareness system 12 and the fuel door sensor 52 may be in communication with the control system 20. In an embodiment, the vehicle awareness system 12 and the fuel door sensor 52 communicate with the control system 20 over a controller area network (CAN) 58.

The control system 20 may include one or more control modules equipped with executable instructions for interfacing with a commanding operation of various components of the vehicle 10, including but not limited to each sensor of the sensor system 18 of the vehicle awareness system 12 and the fuel door sensor 52. Each such control module may include a processing unit 60 and non-transitory memory 62 for executing the various control strategies or modes of the vehicle 10. The processing unit 60, in an embodiment, is configured to execute one or more programs stored in the memory 62 of the control system 20.

A first exemplary program, when executed, may determine when to lock the vehicle doors 26 and close the vehicle windows 24 to improve the security of the vehicle 10, such as when the fuel door sensor 52 indicates that the fuel door 56 has been opened. A second exemplary program, when executed, may determine when to issue a warning 66 to an authorized user in the event an unauthorized object 19 has been detected near the vehicle 10 by the vehicle awareness system 12. For example, if the unauthorized object 19 has been detected, the control system 20 may command the communication system 54 to send the warning to a personal electronic device 64 of the authorized user of the vehicle 10. In an embodiment, the control system 20 may establish a radio frequency (RF) communication with the personal electronic device 64 via the communication system 54. Other communication protocols are also contemplated within the scope of this disclosure. The communication may be unidirectional such that the personal electronic device 64 is only capable of receiving information from the communication system 54, or may be bidirectional such that the personal electronic device 64 is able to receive and send information to the control system 20 through the communication system 54. For instance, an authorized user may send a car alarm request to the control system 20 such that a vehicle alarm is triggered in response to receiving an alert that the unauthorized object 19 has been detected. In other embodiments, the warning 66 may be issued as audible or visual effects, or both.

The personal electronic device 64 may be any of a variety of mobile and/or wearable devices of the authorized user of the vehicle 10. Non-limiting examples of personal electronic devices include cellular phones, tablet computers, smart watches, laptop computers, portable music players, fitness bands, etc.

Figure 3:
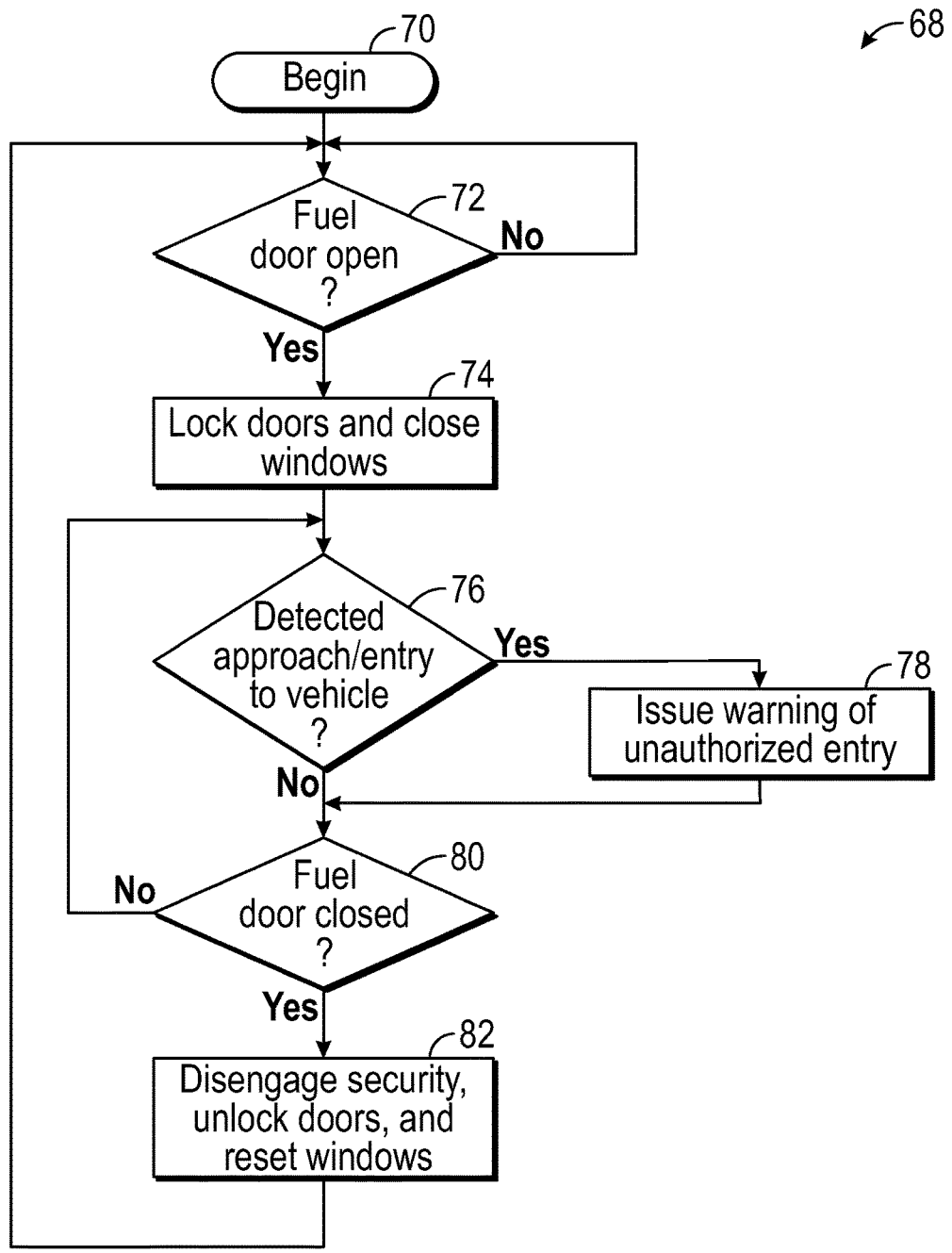
FIG. 3 schematically illustrates a control strategy for monitoring the security of a vehicle using the theft avoidance system of FIG. 2.

FIG. 3, with continued reference to FIGS. 1 and 2, schematically illustrates a control strategy 68 for monitoring the security of the vehicle 10 using the exemplary theft avoidance system 50. In an embodiment, the control system 20 of the theft avoidance system 50 is programmed with one or more algorithms adapted to execute the exemplary control strategy 68.

The exemplary control strategy 68 begins at block 70. At block 72, the control strategy 68 may determine whether or not the fuel door 56 is open. For example, the control system 20 may monitor the status of the fuel door sensor 52 to determine whether or not the fuel door 56 is open. If the fuel door 56 is closed, the control strategy 68 may return to block 70.

Alternatively, if the fuel door 56 is detected as being open at block 72, the control strategy 68 may proceed to block 74 by automatically locking the doors 26 and closing the windows 24 of the vehicle 10. Other security precautions could additionally be taken.

Next, at block 76, the control strategy 68 determines whether an unauthorized object 19 has been detected in or near the vehicle 10. For example, the control system 20 may monitor the status of the sensor system 18 of the vehicle awareness system 12 to determine whether or not the unauthorized object 19 has been detected by the vehicle awareness system 12. If the unauthorized object 19 is detected at block 76, the control strategy 68 may proceed to block 78 and issue the warning 66 to an authorized user. The warning 66 indicates that an unauthorized entry is occurring or is about to occur. In an embodiment, the control system 20 may communicate the alert or warning 66 to the personal electronic device 64 of the authorized user via the communication system 54. In another embodiment, the control system 20 may command an audible or visual warning to be issued by the vehicle 10 (e.g., honk horn, flash lights, etc.). In yet another embodiment, the warning 66 could include a combination of audible warnings, visual warnings, and messages sent to the personal electronic device 64.

Subsequent to each of blocks 76 and 78, the control strategy 68 may recheck the status of the fuel door 56 at block 80. If the fuel door 56 is still open, the control strategy 68 returns to block 76. Alternatively, if the fuel door 56 is closed at block 80, the vehicle security is disengaged, the doors 26 are unlocked, and the windows 24 are reset to their prior positioning at block 82. The control strategy 68 may then return to block 72. This process can thus be repeated to continuously monitor the security of the vehicle 10.

Figure 4:
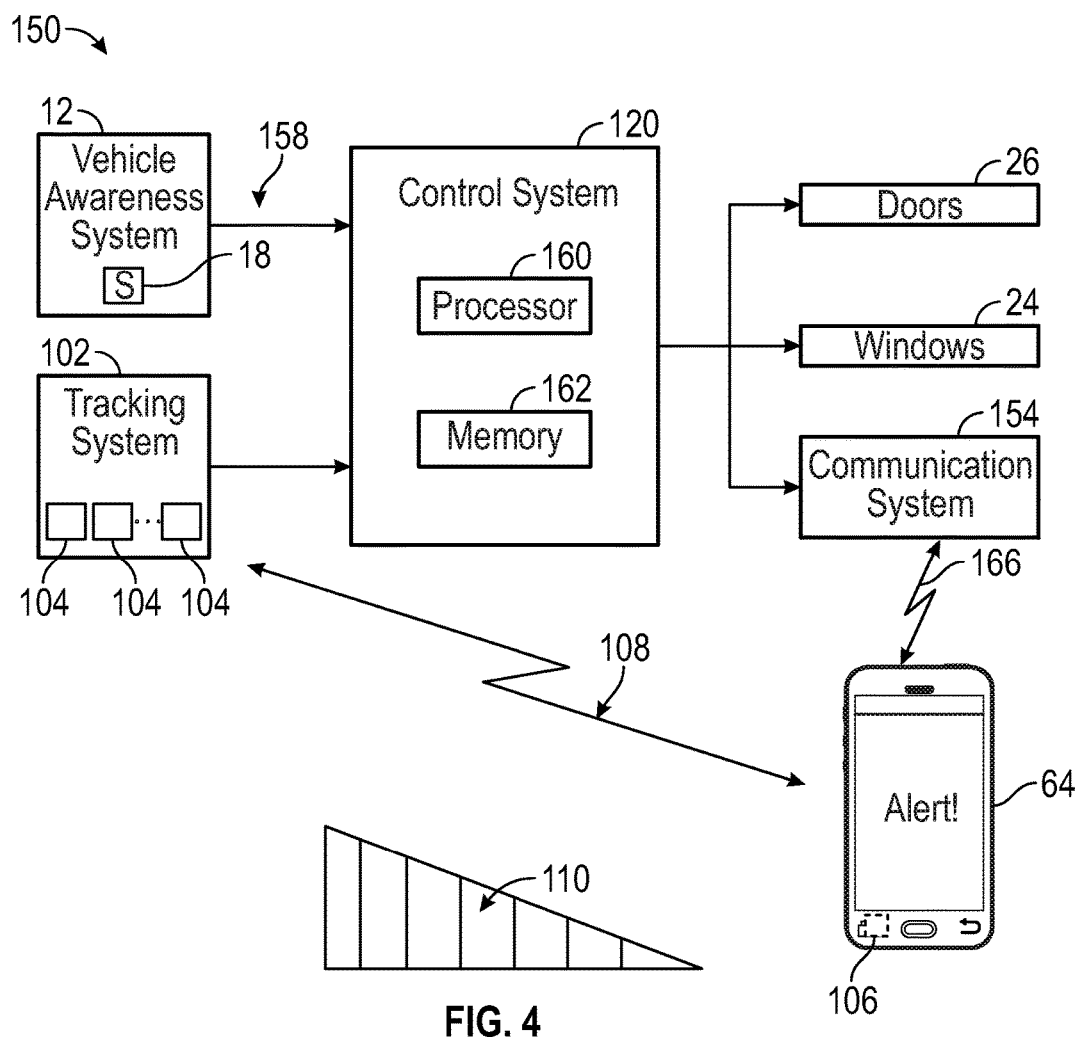
FIG. 4 illustrates a block diagram of a theft avoidance system according to another embodiment of this disclosure.

FIG. 4, with continued reference to FIG. 1, schematically illustrates another exemplary theft avoidance system 150 that may be employed to improve the security capabilities of the vehicle 10. Like the theft avoidance system 50 of FIG. 2, the theft avoidance system 150 is designed to improve the security of the vehicle 10 by reducing the likelihood that someone will tamper with the vehicle 10 at a time in which an authorized user is external to the passenger cabin 16 of the vehicle 10 and temporarily distracted (e.g., pumping gas, loading or unloading cargo, fetching mail or packages, etc.). In this embodiment, the theft avoidance system 150 may include the vehicle awareness system 12, a control system 120, a tracking system 102, and a communication system 154.

As detailed above, the vehicle awareness system 12 includes a sensor system 18 for monitoring whether an unauthorized object 19 (i.e., a thief, onlooker, etc.) is approaching or is near the vehicle 10. During certain situations, the vehicle awareness system 12 may send a signal to the control system 120 if an unauthorized object 19 is detected.

The tracking system 102 is equipped to track a positioning of an authorized user of the vehicle 10. The tracking system 102 may include one or more wireless devices 104 that facilitate the detection of and the proximity of the personal electronic device 64 of the authorized user. The wireless devices 104 may be imbedded or otherwise mounted at various location of the vehicle 10, such as at a roof rack, molding, bumpers, doors, in-vehicle components, etc. of the vehicle 10. In an embodiment, the wireless devices 104 are Bluetooth Low Energy (BLE) transceivers configured to emit low energy Bluetooth signals as a way to determine the proximity of the personal electronic device 64, and thus the authorized user, relative to the vehicle 10.

The personal electronic device 64 may also include a wireless device 106 (e.g., another BLE transceiver, etc.) configured to communicate with the wireless device(s) 104 of the tracking system 102 over a wireless connection 108. The wireless connection 108 may be a BLE connection, a Wi-Fi connection, or any other type of wireless connection.

In an embodiment, the tracking system 102 location tracks the personal electronic device 64 to determine where the authorized user is located relative to the vehicle 10. For example, the approximate distance of the personal electronic device 64 from the vehicle 10 can be obtained by measuring a signal strength 110 over the wireless connection 108 between the wireless device(s) 104 of the tracking system 102 and the wireless device 106 of the personal electronic device 64. This may include the use of various location tracking techniques, including but not limited to proximity, angulation, and lateration methods. During certain situations, the tracking system 102 may send signals to the control system 120 representative of the location of the personal electronic device 64.

The vehicle awareness system 12 and tracking system 102 may be in communication with the control system 120. In an embodiment, the vehicle awareness system 12 and the tracking system 102 communicate with the control system 120 over a CAN 158.

The control system 120 may include one or more control modules equipped with executable instructions for interfacing with a commanding operation of various components of the vehicle 10, including but not limited to each sensor of the sensor system 18 of the vehicle awareness system 12 and each wireless device 104 of the tracking system 102. Each such control module may include a processing unit 160 and non-transitory memory 162 for executing the various control strategies or modes of the vehicle 10. The processing unit 160, in an embodiment, is configured to execute one or more programs stored in the memory 162 of the control system 120.

For example, a first exemplary program, when executed, may determine when to lock the vehicle doors 26 and close the vehicle windows 24 to improve the security of the vehicle 10. A second exemplary program, when executed, may determine when to issue a warning 166 to an authorized vehicle operator in the event an unauthorized object 19 has been detected near the vehicle 10 by the vehicle awareness system 12. For example, if the unauthorized object 19 has been detected, the control system 120 may command the communication system 154 to send the warning 166 to the personal electronic device 64 of the authorized user of the vehicle 10. A third exemplary program, when executed, may track a location of the authorized user as a way to determine whether or not to change a security state (i.e., security engaged, security disengaged, etc.) of the vehicle 10.

Figure 5A:
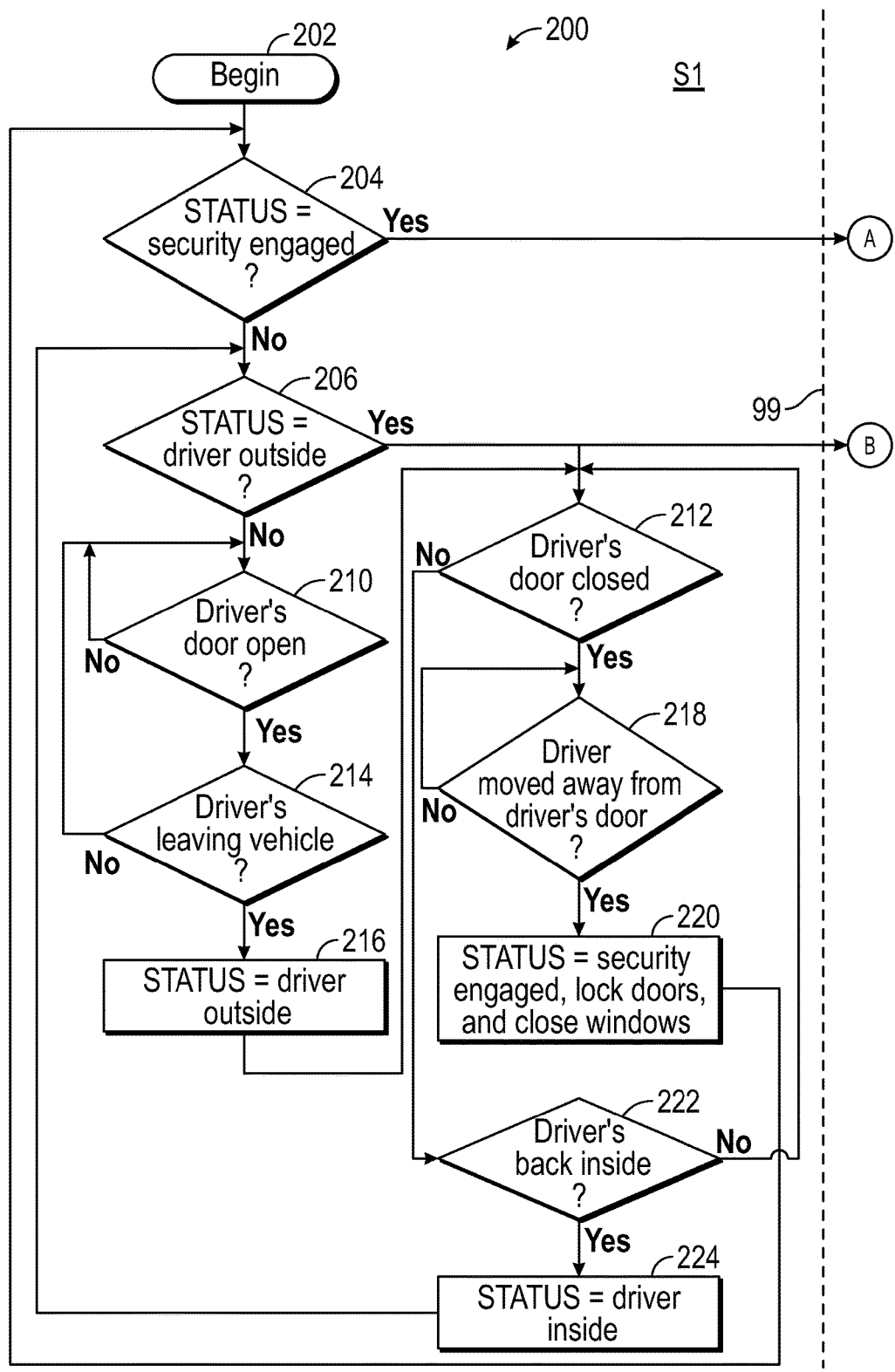
FIGS. 5A and 5B schematically illustrate a control strategy for monitoring the security of a vehicle using the theft avoidance system of FIG. 4.
Figure 5B:
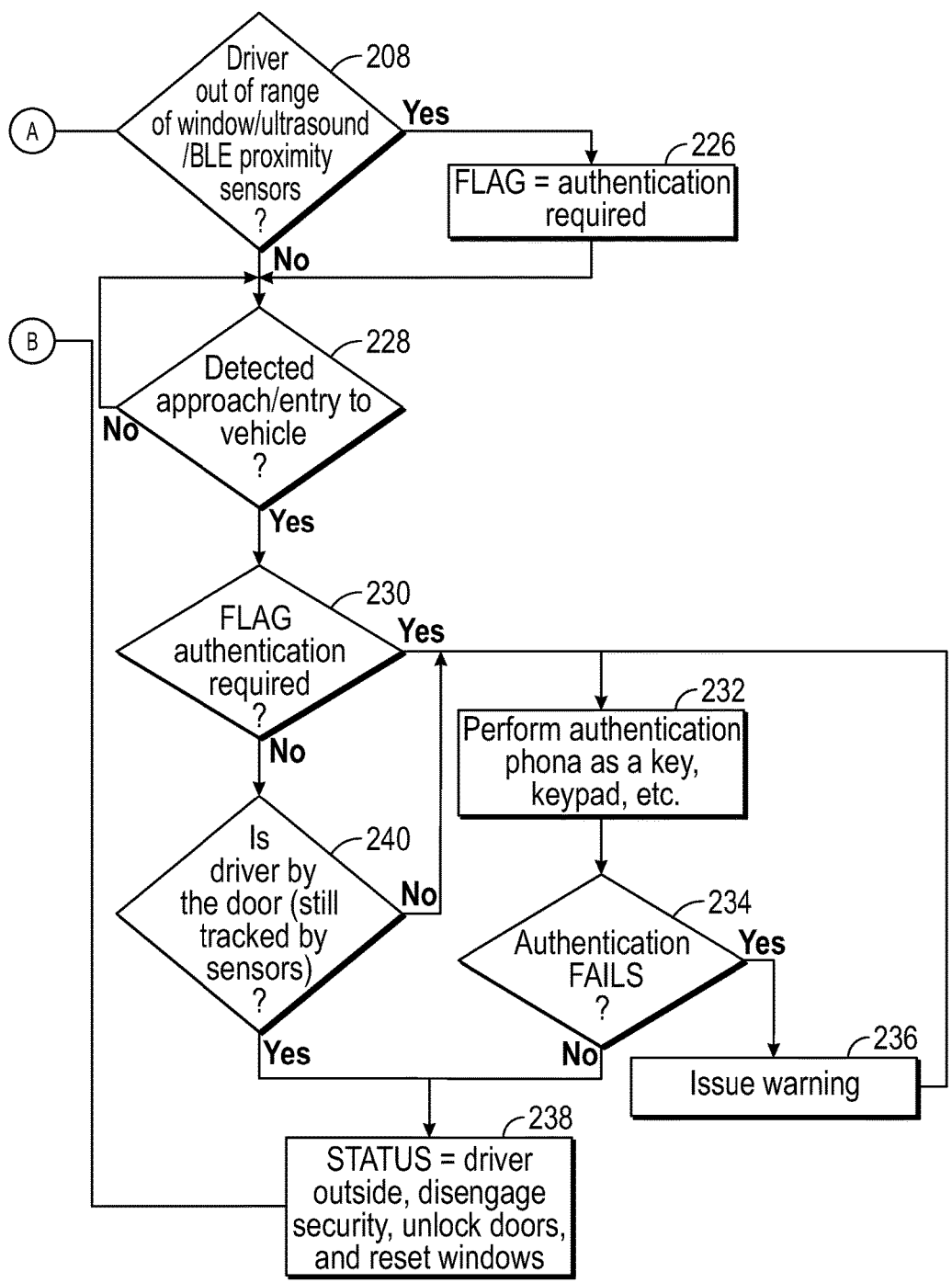

FIGS. 5A and 5B, with continued reference to FIGS. 1 and 4, schematically illustrate another exemplary control strategy 200 for monitoring the security of the vehicle 10. In a non-limiting embodiment, the control system 120 of the theft avoidance system 150 is programmed with one or more algorithms adapted to execute the exemplary control strategy 200.

The exemplary control strategy 200 may include a security disengaged state S1 (see FIG. 5A) and a security engaged state S2 (see FIG. 5B). For illustrative purposes only, these security states S1, S2 are shown as being separated by an imaginary divider (see dashed line 99).

The control strategy 200 begins at block 202. At block 204, the control strategy 200 may determine whether the vehicle 10 is in the security disengaged state S1 or the security engaged state S2. If in the security disengaged state S1, the control strategy 200 proceeds to block 206. If, alternatively, the vehicle 10 is in the security engaged state S2, the control strategy 200 proceeds to block 208.

The status (i.e., inside or outside the vehicle 10) of the authorized user, or driver, is determined at block 206. This may include tracking the location of the personal electronic device 64 of the authorized user using the tracking system 102, for example. The control strategy 200 proceeds to block 210 if the authorized user is inside the vehicle 10 and proceeds to block 212 if the authorized user is already outside of the vehicle 10.

Referring to block 210, the control strategy 200 may determine whether a door, such as the driver-side door, of the vehicle 10 is open. If YES, the control strategy 200 determines whether or not the authorized user is leaving the vehicle 10 at block 214. In an embodiment, block 214 of the control strategy 200 may be performed by one or both of the vehicle awareness system 12 (using seat sensors, proximity sensors, etc.) and the tracking system 102. If it is determined that the authorized user is leaving the vehicle 10, the status of the authorized user is maintained as being outside the vehicle 10 at block 216 and the control strategy 200 may then proceed to block 212.

Referring now to block 212, the control strategy 200 determines whether or not the driver-side door is now closed. If YES, it is next determined whether the authorized user has moved away from the door at block 218. If the user has moved away from the door, the control strategy 200 enters the security engaged state S2 and commands the doors 26 locked and the windows 24 closed at block 220. If; however, the user has not yet closed the door, the control strategy 200 determines whether the authorized user is back inside the vehicle 10 at block 222. The status of the user is confirmed as inside the vehicle 10 at block 224 if the answer to block 222 is YES; otherwise, the control strategy 200 returns to block 212 from the block 222.

The control strategy 200 proceeds to block 208 once the security engaged state S2 has been entered and confirmed. At this step, the control strategy 200 determines whether the authorized user is outside a predefined threshold range relative to the vehicle 10. This may be determined using the vehicle awareness system 12, the tracking system 102, or both. If the answer to block 208 is YES, authentication is required to obtain entry into the vehicle 10 (see authentication flag at block 226). If NO, the control strategy 200 may proceed to block 228 by monitoring whether or not an unauthorized object 19 is approaching the vehicle 10 or attempting to enter the vehicle 10.

If it is determined at block 228 that the unauthorized object 19 is approaching or attempting to enter the vehicle 10, the control strategy 200 proceeds to block 230 by reviewing whether authentication was previously flagged as required at block 226. If YES, an authentication process is performed at block 232 before permitting access to the vehicle 10. The authentication process may include requiring the person attempting entry to enter an access code on the personal electronic device 64 or a keypad of the vehicle 10. Alternatively, the authentication process could include searching for registered key-fobs or smart devices and then allowing passive entry to only those registered devices found at the vehicle 10.

If the authentication process fails at block 234, thus indicating the person attempting entry is unauthorized, the control strategy 200 may proceed to block 236 by issuing a warning. The warning could include one or more of an audible warning (e.g., horn honk), a visual warning (e.g., flashing of lights), or a message communicated to the personal electronic device 64 of the authorized user. Alternatively, if the authentication process is successful at block 234, thus indicating that the person attempting entry is the authorized user, the control strategy 200 may proceed to block 238 by returning to the security disengaged state S1. This may include unlocking the doors 26 and resetting the windows 24 to a prior position.

Referring back again to block 230, if authentication has not been previously required (from block 226), the control strategy 200 may instead proceed to block 240 and determine whether the authorized user is by the driver-side door of the vehicle 10. If YES, the control strategy 200 may proceed to block 238. If NO, the control strategy 200 may proceed to block 232.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle theft avoidance system, comprising:
   an awareness system configured to detect an unauthorized object near a vehicle;
   a tracking system configured to track a positioning of an authorized user of the vehicle;
   a fuel door sensor configured to monitor whether a fuel door of the vehicle is open or closed; and
   a control system in communication with the awareness system and configured to automatically issue a warning when the awareness system detects the unauthorized object near the vehicle and the tracking system detects the authorized user outside the vehicle,
   wherein the control module is configured to automatically lock each door and close each window of the vehicle when the fuel door is open.

2. The vehicle theft avoidance system as recited in claim 1, wherein the awareness system includes a plurality of sensors.

3. The vehicle theft avoidance system as recited in claim 2, wherein the plurality of sensors include a combination of at least two of proximity sensors, ultrasonic sensors, radar sensors, and LIDAR sensors.

4. The vehicle theft avoidance system as recited in claim 1, comprising a communication system configured to issue the warning to a personal electronic device of the authorized user of the vehicle.

5. The vehicle theft avoidance system as recited in claim 1, wherein the warning is a visual warning or an audible warning.

6. The vehicle theft avoidance system as recited in claim 1, wherein the warning is a message sent to a personal electronic device of the authorized user of the vehicle.

7. The vehicle theft avoidance system as recited in claim 1, wherein the tracking system includes a first wireless device that communicates with a second wireless device of the authorized user to track the positioning of the authorized user.

8. A method, comprising:
   monitoring whether a fuel door of a vehicle is open or closed;
   automatically locking each door of the vehicle and closing each window of the vehicle when the fuel door is open;
   tracking a location of an authorized user relative to a vehicle;
   entering a security engaged state when the authorized user is outside the vehicle; and
   warning the authorized user when an unauthorized object is approaching or attempting to enter the vehicle during the security engaged state.

9. The method as recited in claim 8, wherein the fuel door is monitored with a fuel door sensor.

10. The method as recited in claim 8, comprising:
    monitoring whether the unauthorized object is approaching or attempting to enter the vehicle.

11. The method as recited in claim 10, comprising:
    issuing the warning to the authorized user of the vehicle when the unauthorized object is approaching or attempting to enter the vehicle.

12. The method as recited in claim 11, wherein issuing the warning includes:
    communicating the warning to a personal electronic device of the authorized user.

13. The method as recited in claim 8, wherein warning the authorized user includes:
    communicating the warning to a personal electronic device of the authorized user.

14. The method as recited in claim 8, wherein entering the security engaged state includes:
    locking each door of the vehicle; and
    closing each window of the vehicle.

15. The method as recited in claim 8, wherein tracking the location of the authorized user includes:
    determining a proximity of a personal electronic device of the authorized user relative to the vehicle.

16. The method as recited in claim 15, wherein determining the proximity of the personal electronic device includes:
    communicating Bluetooth Low Energy signals between a first wireless device of a tracking system and a second wireless device of the personal electronic device.

17. The vehicle theft avoidance system as recited in claim 1, wherein the warning includes both an audible or visual warning and a message sent directly to a personal electronic device of the authorized user of the vehicle.

18. The method as recited in claim 8, comprising:
requiring authentication of the authorized user prior to allowing reentry into the vehicle.

19. A vehicle theft avoidance system, comprising:
an awareness system configured to detect an unauthorized user near a vehicle;
a fuel door sensor configured to monitor a fuel door position;
a tracking system configured to track a positioning of an authorized user of the vehicle; and
a control system configured to automatically issue a warning when the awareness system detects the unauthorized user near the vehicle and the tracking system detects the authorized user outside the vehicle and further configured to automatically command each door of the vehicle locked and each window of the vehicle closed when the fuel door position is open.

* * * * *